United States Patent
Chandrasekaran

[15] 3,684,786
[45] Aug. 15, 1972

[54] PROCESS FOR PREPARING PERFLUORO-2-BUTYNE POLYMER

[72] Inventor: Swayambu Chandrasekaran, East Orange, N.J.

[73] Assignee: Allied Chemical Corporation, New York, N.Y.

[22] Filed: Nov. 26, 1971

[21] Appl. No.: 202,623

[52] U.S. Cl. ............260/92.1, 204/159.22, 260/87.5, 260/87.7
[51] Int. Cl. .................................................C08f 9/00
[58] Field of Search.....................................260/92.1

[56] References Cited

UNITED STATES PATENTS

| | | | |
|---|---|---|---|
| 2,857,366 | 10/1958 | Middleton | 260/92.1 |
| 3,035,034 | 5/1962 | McKusick et al. | 260/92.1 |
| 3,037,010 | 5/1962 | Harris | 260/92.1 |

*Primary Examiner*—Harry Wong, Jr.
*Attorney*—Michael S. Jarosz et al.

[57] ABSTRACT

Solid homopolymer of perfluoro-2-butyne is prepared by polymerizing perfluoro-2-butyne using small amounts of trifluoromethyl hypofluorite as initiator.

4 Claims, No Drawings

PROCESS FOR PREPARING PERFLUORO-2-BUTYNE POLYMER

This invention relates to a method for polymerizing perfluoro-2-butyne using trifluoromethyl hypofluorite as initiator to obtain solid homopolymer product.

BACKGROUND OF THE INVENTION

Solid homopolymer of perfluoro-2-butyne has, e.g., been described in U.S. Pat. No. 3,037,010 to Harris, Jr. According to that patent, it is obtained by exposing bis-perfluoro-2-butyne to ionizing radiation having an energy of at least 50 electron volts. Solid perfluoro-2-butyne homopolymer has also been prepared using as catalyst certain transition metal complexes (Boston, Sharp and Wilkinson, Jr. Chem. Soc. (London), 1962, Part III, 3488–3494); using triphenylphosphine and trimethylamine, under specific conditions (Cullen and Dawson, Can. Jr. Chem. 45, 2887–2894, (1967)); and using nitrosyl hexafluoroarsenate formed and activated in situ together with boron trifluoride and weak ultraviolet radiation ($\lambda \leq 3100A$) (Ehrenstorfer, Jr. Pol. Sc. Part A-1, 7, 969-970 (1969)).

Copolymer of perfluoro-2-butyne with 1-chloro-1-fluoroethylene and 1,1-difluoro-3-methyl butadiene are disclosed in U.S. Pat. No. 2,966,482 to Bolstad et al. These copolymers are obtained by subjecting the monomers to action of a free radical forming polymerization initiator, such as inorganic persulfates or organic peroxides as, e.g. trichloroacetyl peroxide.

Porter and Cady have described reaction of trifluoromethyl hypofluorite and tetrafluoroethylene to form polymeric materials (Jr. Am. Chem. Soc., 79, 5625–5627 (1957)).

Perfluoro-2-butyne is a known compound which may be prepared by dechlorinating 1,1,1,4,4,4,-hexafluoro-2,3-dichlorobutene-2, having a boiling point of 66°–67° C., by subjecting it to a mixture of zinc dust and absolute alcohol, as described by Henne and Finnegan, Jr. Am. Chem. Soc. 71, 298–300.

Trifluoromethyl hypofluorite, a gas under normal temperature and pressure, may be prepared by reacting carbon monoxide with an excess of fluorine, as described by Kellog and Cady, Jr. Am. Chem. Soc. 70, 3986 (1948).

It is an object of the present invention to provide a method for homopolymerizing perfluoro-2-butyne using a chemical initiator, trifluoromethyl hypofluorite.

DESCRIPTION OF THE INVENTION

Attempts to polymerize perfluoro-2-butyne to obtain solid homopolymer thereof using the inorganic persulfate or organic peroxide free radical initiators commonly employed for effecting homopolymerization or copolymerization of halogenated, olefinically unsaturated monomers failed, no polymeric product was obtained.

I have made the surprising discovery that homopolymerization of perfluoro-2-butyne can be effected using trifluoromethyl hypofluorite as initiator.

Homopolymerization of perfluoro-2-butyne in accordance with the method of my invention is effected by contacting it with trifluoromethyl hypofluorite, optionally in the presence of a suitable liquid polymerization medium. Generally, the trifluoromethyl hypofluorite will be employed in amount of about 0.01 to about 10 percent by weight, based on the monomer charge. The trifluoromethyl hypofluorite may be added initially or, in order to maintain desired polymerization rates, intermittantly or continuously throughout the polymerization.

Suitable liquid polymerization media include aqueous media as well as non-aqueous media such as the liquid monomer and non-polymerizable organic solvents, specifically halogenated hydrocarbons containing up to about 10 carbon atoms, and especially perhalogenated alkanes containing up to about eight carbon atoms, and saturated perfluorocyclic ethers. A partial listing of organic solvents suitable for use as liquid polymerization medium includes perfluorocyclobutane, pentachlorofluoroethane, trichlorotrifluoroethane, 1,1,2,2-tetrachloro-1,2-difluoroethane, 1,1,1,2-tetrachlorodifluoroethane, octafluoropropane, perfluoro-n-pentane, trichlorofluoromethane, dichlorofluoromethane, dichlorodifluoromethane, 1,2-dichloro-1,1,2,2-tetrafluoroethane, and the like. When the polymerization is to be carried out in an aqueous medium, it may be carried out in aqueous suspension or emulsion in the presence of suspending or emulsifying agent known to be effective in suspending or emulsifying fluorinated monomers without interfering with their polymerization.

Polymerization temperatures and pressures are not critical. The polymerization may be carried out at temperatures within the range of about −80° to about +100° C. It is preferably carried out at temperatures in the range of about −78°C., to about +80° C. and, more preferably yet, at temperatures within the range of about −30° to about +50° C. When the polymerization is to be conducted in an aqueous medium, then, of course, the polymerization temperature may not be lower than about 0° C. In any event, polymerization in accordance with the present invention is carried out at temperatures above those at which the polymerization mixture will solidify.

The polymerization may be carried out at any desired pressure. Pressures from about atmospheric to 3,000 atmospheres can be used, but it is suitably conducted at pressures ranging from about atmospheric to about 500 atmospheres. For reasons of economy in equipment design, polymerization is preferably carried out at pressures below about 200 psig. While ordinarily the polymerization would be conducted under autogenous pressure as it may prevail under chosen polymerization conditions, it may also be conducted under superimposed pressures obtained by charging the polymerization zone with an inert gas, such as, e.g. nitrogen.

Recovery of the homopolymer product from the polymerization medium follows conventional procedure. When the polymerization is carried out in liquid monomer or in the presence of organic solvents, as hereinabove described, or in aqueous suspension, then the homopolymer product is generally obtained as a white granular powder which can be readily separated from the reaction medium by conventional methods, such as by filtration or by evaporating excess monomer, initiator and solvent, under reduced pressure and/or elevated temperature, if desired. The homopolymer product, after separation from the reaction medium, may be washed with suitable solvents as, e.g., methanol.

The following example describes a preferred embodiment of the method of the present invention and sets forth the best mode contemplated for its practice.

EXAMPLE I

A Pyrex tube of one-fourth inch diameter and 6 inch length was evacuated and chilled in liquid nitrogen. One half gram of hexafluoro-2-butyne monomer was condensed into the tube, followed by 0.01 gram of trifluoromethyl hypofluorite. The tube was sealed and allowed to warm to room temperature (about 25° C.). Upon standing at room temperature for about 15 minutes, formation of fine, white precipitate within the tube was observed. The tube was opened, the polymer product was separated from the monomer by evaporating residual monomer and unreacted initiator under vacuum to obtain 0.06 gram of the desired perfluoro-2-butyne product in form of fine, white powder. Conversion of monomer to solid product was 12 percent. The powder was pressed into KBr pellets for infrared analysis. Spectra obtained showed strong absorption peaks at 7.85, 8.07, 8.35 and 8.50 microns, weak absorption peaks at 11.37 and 14.0 microns. No absorption was detected corresponding to the spectral region of carbon-carbon double bonds. The polymer product did not melt when heated to 460° C. but began to decompose above this temperature.

The following experiments show that persulfate and peroxide initiators conventionally employed for effecting homo- and copolymerization of halogenated, ethylenically unsaturated monomers are incapable of effecting homopolymerization of perfluoro-2butyne.

EXPERIMENT I

A Pyrex tube of 1/4 inch diameter and 6 inch length was evacuated at room temperature, chilled in liquid nitrogen, and 1 ml. of perfluoro-2-butyne was condensed into the tube, followed by addition of 0.05 gram of benzoyl peroxide. The tube was degassed at liquid nitrogen temperature, was sealed and allowed to warm to room temperature. It was then heated to about 80° C. by immersion in a water bath. After 5 hours at about 80° C. no polymer particles could be seen in the tube. The tube was opened, vented and monomer was removed by evacuation. Upon evacuation no solid polymer, nor any oily residue could be seen inside the tube.

EXPERIMENT II

This experiment illustrates an attempt to effect homopolymerization of perfluoro-2-butyne in aqueous suspension using a water-soluble free radical initiator.

A 100 ml. aerosol bottle equipped with magnetic stirrer was charged with 30 ml. of deionized water and 0.05 gram of potassium persulfate. The tube was evacuated at room temperature, chilled in a dry-ice acetone mixture and 10 grams of perfluoro-2-butyne monomer were condensed into the tube. The tube was then chilled in liquid nitrogen and degassed at 500 micron vacuum. The tube was sealed, allowed to warm to room temperature, followed by heating to 70° C. in a water bath under constant agitation. After 5 hours at 70° C. no polymer could be observed within the tube. The tube was then vented, evacuated and the water was removed by distillation under vacuum. The residue consisted solely of initiator. No polymeric residue was detected.

EXPERIMENT III

This experiment illustrates an attempt to effect homopolymerization of perfluoro-2-butyne at 0° C. using trichloroacetyl peroxide as initiator.

Following the procedure of Experiment I, a one-fourth inch diameter, 6 inch long Pyrex tube was charged with 0.05 ml. trichloroacetyl peroxide (as 0.2 g./ml. solution in asym.-trichlorotrifluoromethane) and 1 ml. of perfluoro-2-butyne. Tube and contents were allowed to stand at $0° \pm 2°C.$ for a period of 4 hours. At the end of the 4-hour period no polymer was observed within the tube. The tube was then allowed to warm to room temperature, and was kept at this temperature for 1 additional hour. No polymer was observed inside the tube at the end of that period. The tube was then opened, perfluoro-2-butyne monomer was allowed to evaporate, leaving no residue.

EXPERIMENT IV

This experiment illustrates an attempt to effect homopolymerization of perfluoro-2-butyne using oxygen-activated bis-n-butyl boron catalyst.

A one-fourth inch diameter, 6 inch long Pyrex tube was charged with 0.1 ml. of bis-n-butyl boron (as a 20 percent solution in asym.-trichlorotrifluoromethane), and pure oxygen was bubbled through the solution for a period of 10 seconds. The tube was then connected to a vacuum manifold, chilled in liquid nitrogen and evacuated. One ml. of perfluoro-2-butyne was condensed into the tube and the tube was sealed. The tube was then immersed into a dryice acetone bath at −78°C. After 5 hours at −78°C. no polymer could be observed within the tube. The tube was vented and evacuated at 50° C. No solid polymer, nor any oily reside could be found within the tube.

Perfluoro-2-butyne homopolymer is eminently suitable for use in coatings for surfaces which are in contact with corrosive liquids, such as acids and bases, as high temperature electrical insulation, or in other uses wherein its high thermal stability and chemical inertness can be used to advantage.

Use of trifluoromethyl hypofluorite as initiator for polymerizing perfluoro-2-butyne in accordance with the present invention results in homopolymer of high degree of purity, essentially uncontaminated by polymerization side-products and catalyst residues. Catalyst residues are readily separated from the product by simple expedient of evaporation. For these reasons perfluoro-2butyne polymer made in accordance with the method of the present invention has an advantageous combination of mechanical, thermal, electrical and chemical properties not readily obtainable in such polymer prepared using known chemical polymerization initiator for perfluoro-2-butyne.

Since various changes and modifications may be made in the invention without departing from the spirit and essential characteristics thereof, it is intended that all matter contained in the above description shall be interpreted as illustrative only, the invention being limited only by the scope of the appended claims.

I claim:
1. The method for homopolymerizing perfluoro-2-butyne which comprises contacting perfluoro-2-butyne under polymerization conditions with trifluoromethyl hypofluorite.
2. The method of claim 1 wherein the trifluoromethyl hypofluorite is employed in amount of between about 0.01 and about 10 percent by weight, based on the weight of the perfluoro 2-butyne.
3. The method of claim 1 conducted in the presence of a non-polymerizable organic solvent.
4. The method of claim 1 conducted in an aqueous polymerization medium.

* * * * *